United States Patent
Low et al.

(10) Patent No.: US 9,032,051 B2
(45) Date of Patent: May 12, 2015

(54) AUTOMATIC DIFFERENTIATION OF SETUP TYPE IN ROUTER SETUP APPLICATION

(75) Inventors: Aidan N. Low, Seattle, WA (US); Mike Mouawad, Laguna Hills, CA (US); Nolan D. O'Brien, Seattle, WA (US); Siddhartha Dattagupta, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 13/227,676

(22) Filed: Sep. 8, 2011

(65) Prior Publication Data

US 2013/0067041 A1 Mar. 14, 2013

(51) Int. Cl.
| | |
|---|---|
| *G06F 15/177* | (2006.01) |
| *H04W 8/24* | (2009.01) |
| *H04W 4/00* | (2009.01) |
| *H04W 48/10* | (2009.01) |
| *H04W 24/02* | (2009.01) |

(52) U.S. Cl.
CPC .............. *H04W 8/245* (2013.01); *H04W 4/001* (2013.01); *H04W 48/10* (2013.01); *H04W 24/02* (2013.01)

(58) Field of Classification Search
USPC ................... 709/220–222, 250; 370/255, 463
See application file for complete search history.

(56) References Cited

U.S. PATENT DOCUMENTS

| | | | | |
|---|---|---|---|---|
| 2006/0165103 | A1* | 7/2006 | Trudeau et al. ............... | 370/401 |
| 2006/0171388 | A1* | 8/2006 | Ikeda ............................ | 370/389 |
| 2007/0206527 | A1* | 9/2007 | Lo et al. ....................... | 370/328 |
| 2007/0242543 | A1* | 10/2007 | Romanovskyy et al. ..... | 365/208 |
| 2007/0242643 | A1* | 10/2007 | Chandra et al. ............... | 370/338 |
| 2008/0298333 | A1* | 12/2008 | Seok ............................ | 370/338 |
| 2010/0008279 | A1* | 1/2010 | Jeon et al. ..................... | 370/311 |
| 2010/0017847 | A1* | 1/2010 | Kawai et al. ..................... | 726/1 |
| 2010/0097986 | A1* | 4/2010 | Ylitalo et al. ................. | 370/328 |
| 2010/0260069 | A1* | 10/2010 | Sakamoto et al. ............ | 370/254 |
| 2012/0166519 | A1* | 6/2012 | Iyer et al. ...................... | 709/203 |
| 2012/0184242 | A1* | 7/2012 | Li et al. ......................... | 455/406 |

OTHER PUBLICATIONS

U.S. Appl. No. 12/732,446 (03919.0184) filed Mar. 26, 2010, titled, "System and Method for Simplifying Secure Network Setup."

* cited by examiner

*Primary Examiner* — Moustafa M Meky
*Assistant Examiner* — Kidest Mendaye
(74) *Attorney, Agent, or Firm* — Patterson & Sheridan LLP

(57) ABSTRACT

Techniques are presented for configuring multiple client devices to connect to a network device (e.g., a wireless router). In one embodiment, a setup application executing on one of the client devices determines if the network device has previously been configured. For example, the network device may broadcast a predefined network name to advertise that a user access point has been configured. If the polling setup application detects the predefined network name, then it can skip any steps that would configure the network device. Accordingly, the setup application only configures the client device to connect to the network device.

16 Claims, 5 Drawing Sheets

AUTOMATIC DIFFERENTIATION OF SETUP TYPE IN ROUTER SETUP APPLICATION

TECHNICAL FIELD

Embodiments presented in this disclosure generally relate to connecting multiple client devices to a network device.

BACKGROUND

Most users have limited knowledge of the technical aspects of computer networking, and consequently, have difficulty configuring secure wireless networks. A typical private network may include one or more computing devices, a common network device such as a router, and a connection to a wide access network (WAN). Configuring the private network typically requires two phases: configuring the different settings and functionalities of the network device and configuring one or more computing devices to connect to the network device. To aid in this process, many manufactures of network devices provide a setup application that guides a user through these steps. Depending upon the particular devices and existing network configuration, configuring a private network may require the user to input one or more of the following identifiers and passwords: web address of the router (e.g., 192.168.0.1, etc.), an administrative username and password, a network name or service set identifier (SSID) (i.e., a name that identifies a wireless LAN and may have up to 32 characters), a network password (i.e., security key or passphrase), and a media access control (MAC) address (i.e., a unique identifier assigned to a network adapter or network interface card, often referred to as a physical address).

After both the network device and the first client device are configured, the user may install the setup application on a second client device and configure that client device to also connect to the network device. However, because the network device has previously been configured, this step may be omitted. Accordingly, the setup application may prompt the user to specify whether both the network device and the client device need to be configured—i.e., a first install—or whether only the client device should be configured to connect to the network device—i.e., a second (or later) install.

BRIEF DESCRIPTION OF THE DRAWINGS

So that the manner in which the features of the present invention can be understood in detail, a more particular description of the invention may be had by reference to example embodiments, some of which are illustrated in the appended drawings. It is to be noted, however, that the appended drawings illustrate only example embodiments and are therefore not to be considered limiting of its scope, for the invention may admit to other equally effective embodiments.

DESCRIPTION

Overview

Figure 1:
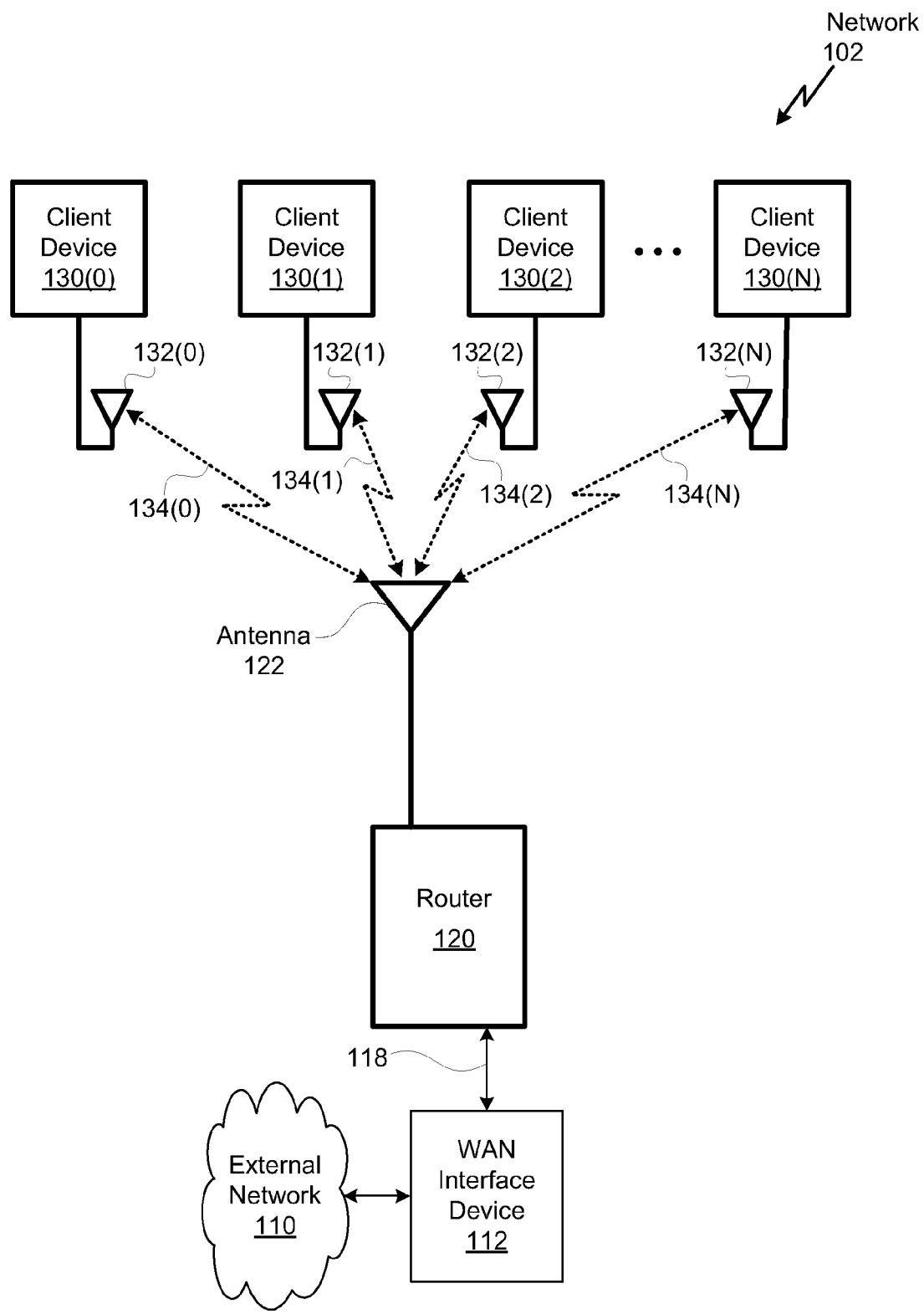
FIG. 1 illustrates a network, according to one embodiment.

One embodiment presented in this disclosure includes a method and computer program product for configuring a computing device to connect to a network device that broadcasts a first and a second beacon. The method and computer program product may generally include determining whether a first network name associated with the first beacon matches a predetermined network name. If the first network name matches the predetermined network name, the method and computer program product present to a user of the computing device a first interface for configuring the computing device to connect to the network device using a second network name associated with the second beacon. Otherwise, the method and computer program product present to the user a second interface for configuring the network device.

One embodiment presented in this disclosure includes a network device that includes a radio that broadcasts a first and a second beacon. A first network name and a second network name are associated with a first access point associated with the first beacon. The network device switches from the second network name to the first network name upon receiving a command from a computing device. Moreover, the first predetermined network name indicates that a second access point associated with the second beacon has previously been configured. Upon detecting the first predetermined network name, a client application presents to a user of a computing device a first interface for configuring the computing device to connect to the network device using a third network name associated with the second beacon

DESCRIPTION OF EXAMPLE EMBODIMENTS

Private local area networks (LANs) may be used to enhance the usefulness and potential of computing devices and other electronic devices in homes and small businesses. In a LAN, devices may be linked together through a network device, e.g., a router. The router may be connected to other private and public networks, such as the Internet. In such a configuration, the router facilitates communication by routing packets of data between the devices within the LAN and also to and from other devices in private and public networks outside the LAN. Thus, home users and small businesses may use LANs to enable their computing devices and other electronic devices to communicate both within the private network and outside the private network.

Embodiments presented in this disclosure provide techniques for streamlining the process of configuring one or more client devices to connect to a networking device, such as a wireless router. In one such embodiment, the router broadcasts a beacon that includes a predefined network name which informs a setup application that the router has previously been configured and is accepting additional wireless connections. In other words, the predefined network name indicates that there is an existing access point already configured on the router and that the setup application should configure the client device to connect to that access point. The setup application may then connect to the router using the predefined network name to connect to a first access point to retrieve data—e.g., a network name and associated password—for connecting to a second access point. The setup application, which is capable of configuring both the router and a client device to connect to the network, can then skip any steps that configure the settings of the router. Instead, the setup application configures only the client device to connect to the second access point using the retrieved data.

FIG. 1 illustrates a network 102, according to one embodiment. As shown, the network 102 comprises a router 120, one or more client devices 130, and a WAN interface device 112 coupled to the external network 110. The WAN interface device 112 may implement a cable modem, digital subscriber line (DSL) modem, fiber to the home interface, or any other technically feasible device that provides digital network connectivity to the external network 110. The WAN interface device 112 is coupled to the router 120 via a network interface 118. In one embodiment, the network interface 118 implements the well-known Ethernet standard.

The router 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured to establish wireless client links 134 to antennas 132 coupled to corresponding client devices 130. The router 120 may implement Ethernet layer 2 switching for wireless data packets forwarded among client devices 130 as well as internet protocol (IP) layer 3 routing between an IP domain associated with the smart network 102 and the external network 110. In this configuration, the router 120 provides related services and protocols, such as Dynamic Host Configuration Protocol (DHCP), network address translation (NAT), and the like.

Although a router 120 is shown, the disclosure is not limited to such, but rather any network device (e.g., bridge, switch, etc.) that performs the functions described herein is contemplated by this disclosure. Similarly, the techniques discussed in this disclosure are not limited to client devices 130 that wirelessly connect to a router, but may be any computing device that performs the functions described herein by connecting wirelessly or by wire to a network device.

Configuring a Smart Network Using a Setup Application

Figure 2:
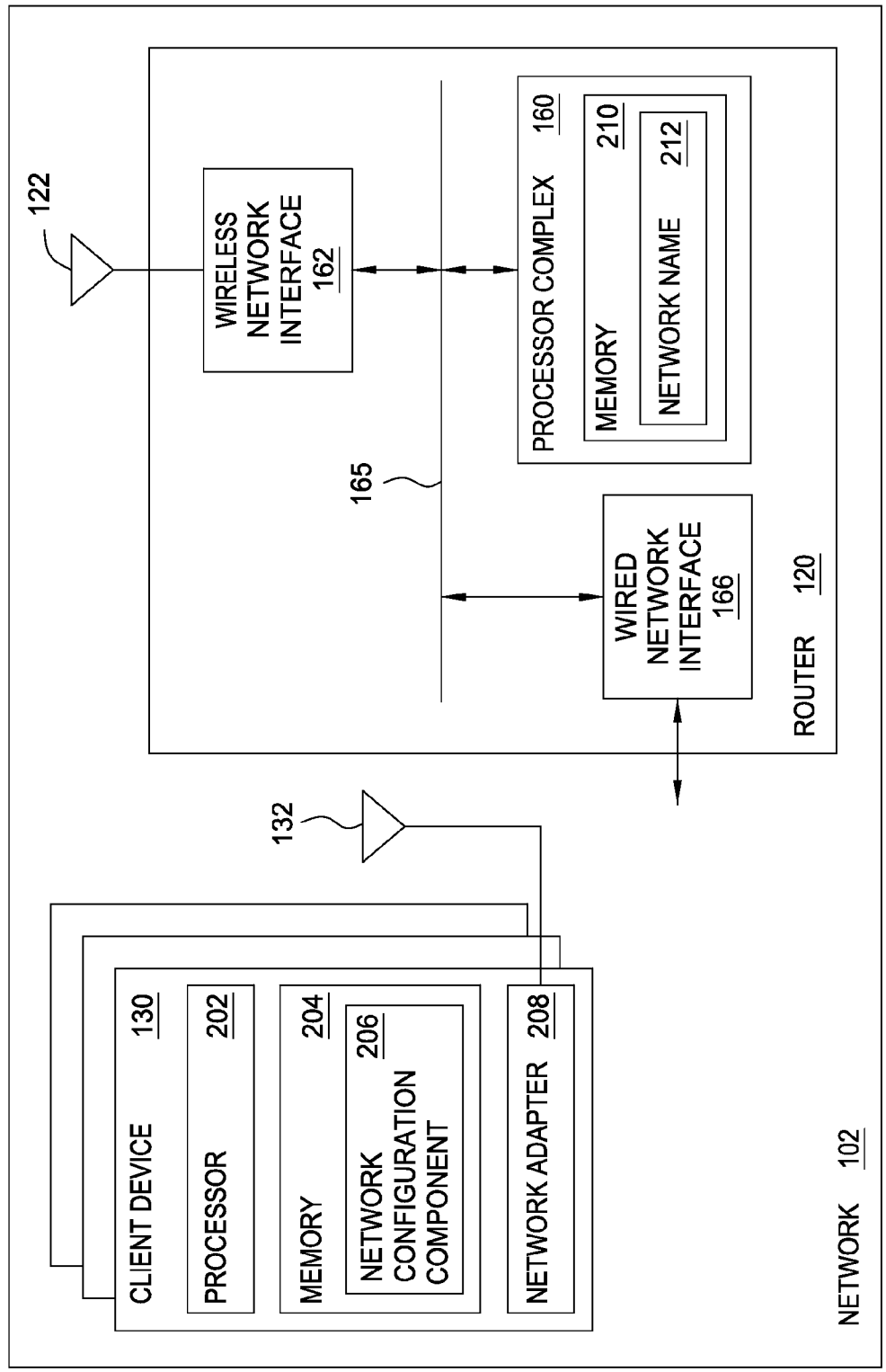
FIG. 2 illustrates a portion of the network of FIG. 1, according to one embodiment.

FIG. 2 is a system diagram of a network, according to one embodiment. Like the system illustrated in FIG. 1, a plurality of client devices 130 may wirelessly connect to a router 120. Each client device 130 also includes a processor 202, memory 204 and network adapter 208. The processor 202 may be a central processing unit (CPU) while the network adapter 208 may be a network interface controller or card. Moreover, the network adapter 208 may be communicatively coupled to the router 120 via the antenna 132.

Memory 204 may include non-volatile memory for storing persistent programs, program state, and configuration information as well as random access memory (RAM) for storing temporary or volatile data. The memory 204 stores a network configuration component 206 (i.e., a setup application) that is capable of configuring both the router 120 and one or more client device 130 in a network 102. Specifically, the network configuration component 206 may cause the client device 130 to send messages to the router 120. Further, the network configuration component 206 may use a display device and I/O devices (not shown) attached to the client device 130 to transmit information to and receive instructions from a user of the client device 130. In this manner, the network configuration component 206 may configure at least a portion of the network 102.

The network configuration component 206 may be developed in any number of programming languages capable of performing operations necessary to implement an embodiment of the present disclosure. The network configuration component 206 may include configuration settings that are encoded using, for example, Extensible Markup Language (XML) format. In other embodiments, the network configuration component 206 and configuration settings could be provisioned in another component or element such as a wireless network adapter, which could be provided to a client device to be configured in network 102. The network configuration component 206 may provide prompts to the user and receive information from the user via a user interface displayed on a display device attached to the client device 130.

In one embodiment, the network configuration component 206 can operate in at least two modes. In the first mode (i.e., a full configuration mode), the network configuration component 206 configures the router 120 as well as configures the client device 130 to connect to the router 120. In the second mode (i.e., a partial configuration mode), the network configuration component 206 only configures the client device 130 to connect to the router 120 and does not configure or change the settings of the router 120. Because the network configuration component 206 needs only to configure the router 120 once, each time the network configuration component 206 is executed to connect a client device 130 to the router 120 only the partial configuration mode is necessary. For example, a user may use the network configuration component 206 to configure both the router 120 and the client device 130. However, the user may then use the network configuration component 206 on a different client device 130 to configure it to connect to the router 120. In such a case, only that client device 130 would need to be configured.

The network configuration component 206 may prompt a user to determine whether to perform a full or a partial configuration. Alternatively, the network configuration component 206 may automatically detect which configuration mode is appropriate. For example, the network configuration component 206 may use the network adapter 208 to scan (i.e., poll) for a predefined SSID which indicates what configuration mode is appropriate. The router 120 may broadcast one beacon with a predefined SSID when the router 120 has already been configured and is accepting additional wireless connections and a different predefined SSID when the router 120 has not. Advantageously, by detecting the predetermined SSID, the network configuration component 206 avoids having to ask the user a question that she may not understand—i.e., whether to perform a full or partial configuration.

The router 120 shown in FIG. 2 is the same as the router 120 shown in FIG. 1E except for illustrating the memory 210 found in the processor complex 160. The memory 210 may be non-volatile memory for storing persistent programs, program state and configuration information, or random access memory (RAM) for storing temporary or volatile data. The memory 210 may contain network names 212 (i.e., one or more SSIDs) that are preloaded into the router 120 during manufacturing. Alternatively, the network names 212 may be stored during a QA testing phase of the router 120. Because the router 120 has a preloaded store of network names 212, the router 120 may broadcast one of these network names 212 in a beacon (which includes both a MAC address and a SSID) without receiving the network name from a wired or wirelessly connected client device (or any other computing device).

In a typical first install of a local access network in the full configuration mode, a network device is powered on and begins to broadcast a standard SSID (e.g., CISCOXXXXX where XXXXX may be, for example, a serial number of the network device or a randomly assigned number). A setup application (e.g., network configuration component 206) may detect the standard SSID and connect to the network device. The setup application may then receive from a user a desired SSID or network name which is then transmitted to the network device. In this manner, the standard SSID is changed to an SSID defined by the user. This standard SSID may also inform the setup application that the network device has not been previously configured and that it should run in full configuration mode.

In addition, the router 120 may be configured with open encryption so the first time the user powers up the router, the standard SSID advertises an open access point with no encryption, allowing anyone with an Internet connection to join the network provided by the host router 120. Therefore, properly securing the router 120 during the setup configuration is common and the user may be prompted to select an encryption protocol such as, for example, Wired Equivalent Privacy (WEP) encryption or Wi-Fi Protected Access (WPA and WPA2) encryption. Similarly, the user may be prompted to provide an encryption key, password or passphrase for the network.

Moreover, a network device may be able to broadcast multiple beacons that each represent a different "virtual access point" (VAP) that may all connect to the same IP network. Most network devices act as central points between a wireless (e.g., network 102) and a wired network (e.g., the Internet). A VAP is a logical entity that exists within a physical access point. When a single physical access point supports multiple virtual access points, each virtual access point appears to computing devices to be an independent physical access point. Each VAP in a single physical access point may advertise a distinct unique identifier—a SSID—in a beacon. Alternatively, multiple virtual access points can advertise the same SSID each with a different capability set, which allows access to the IP network to be provided via diverse security schemes. Through virtual access points, a single provider may offer multiple services, as well as enabling multiple providers to share the same physical infrastructure.

Furthermore, a network device may broadcast multiple VAPs using only one radio (i.e., the wireless network interface 162 and antenna 122). The radio transmits a beacon for each virtual access point that it supports at a beacon interval (e.g., typically 100 milliseconds). Moreover, the VAPs for a single physical access point may be distributed on a single band or among multiple bands—e.g., 2.4 GHz and 5 GHz.

In one embodiment, the router 120 may broadcast two VAPs using two respective beacons when the router 120 is powered on. One VAP may be the standard or user VAP that is initially assigned the standard SSID (e.g., CISCOXXXX) which is then typically changed by a user of a client device 130. The second VAP (referred to herein as the "setup VAP") may be assigned a predetermined SSID that indicates a state of the setup VAP. Both the standard VAP and the setup VAP may be a logical entity of the same physical access point that permits entry into the IP network (i.e., the Internet).

The closed state of the setup VAP may indicate that the router 120 will reject any incoming connections to the setup VAP. For example, the SSID assigned to the setup VAP when in the closed state may be setupVAP_CLOSED. A network configuration component 206 may receive the beacon associated with the setup VAP and determine that, based on the SSID, the setup VAP is in the closed state. Conversely, when the router 120 changes the setup VAP to the open state, the network name or SSID for the beacon may be changed to setupVAP_OPEN. The network configuration component 206 may receive this beacon and determine that the setup VAP will accept incoming connections. That is, the network configuration component 206 is able to connect to the router 120 using the setup VAP. In one embodiment, one or both of the SSIDs associated with the closed and open states are stored in the memory 210 and are not received by any computing device that is communicatively coupled, either wirelessly or by wire, to the router 120 after the router 120 has been packaged and sold.

In one embodiment, the state of the setup VAP indicates whether an existing network—e.g., the user VAP—has previously been configured. For example, if the setup VAP is in the open state, then network configuration component 206 configures the client device 130 to connect to the already existing network. But if the setup VAP is in the closed state, the network configuration component 206 does not automatically know that the user VAP has already been configured; instead, the network configuration component 206 may prompt the user via an interface to determine what portion of the network 102 she is attempting to configure.

In another embodiment, instead of broadcasting a beacon associated with the setup VAP, the router 120 may only broadcast a beacon containing the setupVAP_OPEN SSID when the router 120 is in the open state. Otherwise, the router 120 does not broadcast any beacon or SSID representing the setup VAP.

In one embodiment, the user may need to enter in a PIN in order to access the router 120 using the setup VAP. This may ensure that the user has connected to the correct router 120 if two routers in wireless range that are both in an open state. The PIN may also provide additional security to prevent unwanted client devices from connect to router 120 via the setup VAP.

Figure 3:
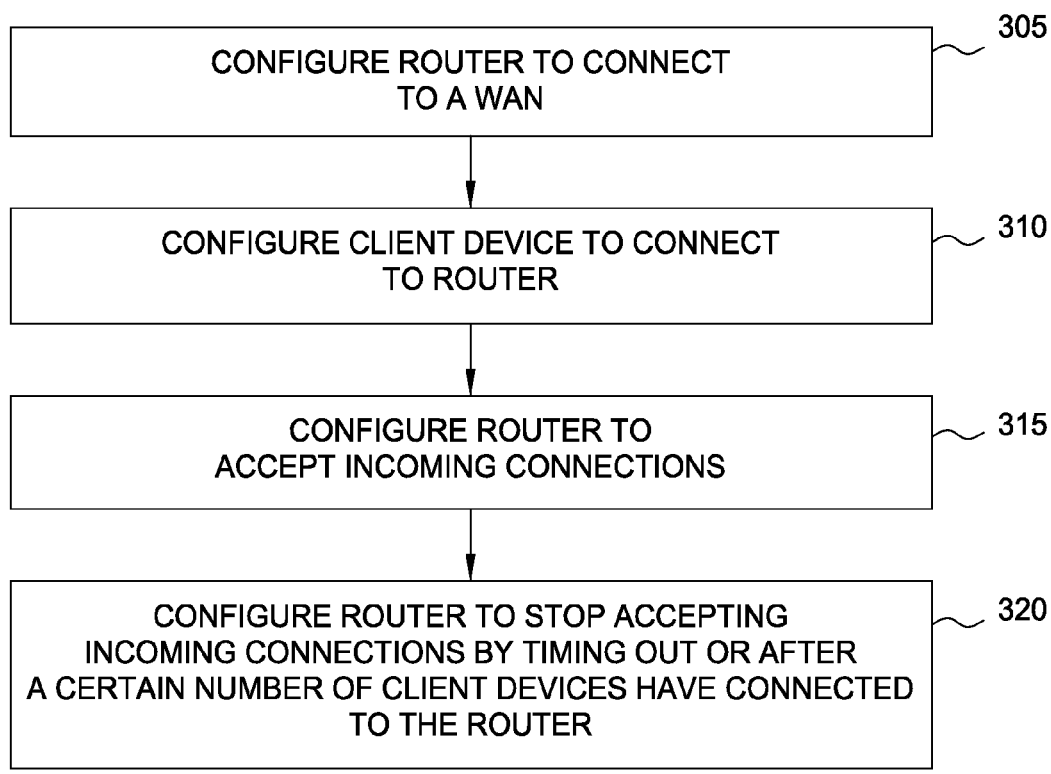
FIG. 3 is a flow illustrating a setup application for configuring a network, according to one embodiment.

FIG. 3 is a flowchart illustrating a setup application configuring a local access network. At step 305, the network configuration component 206 is run on a first client device 130 to configure the router 120 and to configure the first client device 130 to connect to the router 120. Specifically, the network configuration component 206 searches (i.e., polls) for a router 120 broadcasting a predetermined SSID (e.g., "CISCOXXXXX") as previously described herein. If a router 120 is found with this standard SSID, then the network configuration component 206 may assume that the router 120 has not been previously configured and may configure the router 120.

Configuring the router 120 may include establishing an administrative username and password, a network name or the SSID to replace the standard SSID, a network password (i.e., security key or passphrase), a time zone, a Dynamic Host Configuration Protocol (DHCP) service, and the like. Because the router 120 was not previously configured—e.g., the standard SSID was changed to a user defined SSID—the network configuration component 206 may then assume that the first client device 130 is not configured to connect to the router 120. At step 310, the network configuration component 206 configures the client device 130 to connect to the router 120. Moreover, the network configuration component 206 may install additional software (i.e., a client application) on the client device 206 to facilitate communication between the client device 130 and other computing devices in the network 102.

In a typical network 102, an instance of the network configuration component 206 may be executed on each of the client devices 130(1)-(N) to configure them to connect to the router 120. However, as mentioned previously, the network configuration component 206 may not need to reconfigure or provide any settings to the router 120 since that was performed in step 305. Accordingly, the network configuration device 206 may prompt a user to determine if she will be configuring other client devices 130 to connect to the router 120. If the user responds in the affirmative, at step 315 the network configuration component 206 configures the router 120 to accept incoming connections on its setup VAP. That is, the network configuration component 206 may transmit either a wired or wireless command that causes the router 120 to change the setup VAP from the closed state (e.g., the default state when the router 120 powers on) to the open state. For example, the network configuration component 206 may send the command to the router 120 using the standard VAP that was configured in steps 305 and 310.

Once the router 120 receives the command, it changes the setup VAP to the open state which causes the associated beacon to include an SSID reflecting that the setup VAP will accept incoming connections—e.g., setupVAP_OPEN. However, in one embodiment, the network configuration component 206 does not provide the predetermined SSID to the router 120. Instead, both the router 120 and the network configuration component 206 already have stored a copy of the predetermined SSID.

In one embodiment, once the setup VAP is in the open state, any computing device within wireless range may connect to the router 120 using the setup VAP. For example, the router 120 may be initially configured such that when the setup VAP is in the open state, it becomes an open access point with no encryption and with a published SSID, allowing anyone with an Internet connection access to any devices connected to the router 120. Accordingly, the network configuration component 206 or the router 120 may undertake security measures, such as a PIN, to minimize the risk of an unintended computing device connecting to the router 120 via the setup VAP. In one embodiment, a client device 130 that is communicatively coupled to the setup VAP can only communicate with the router 120 itself. Alternatively, the setup VAP may provide access for the client device 130 to connect to an IP network (i.e., the LAN or WAN).

At step 320, the network configuration component 206 may configure the router 120 to revert back the setup VAP to the closed state when a timer expires, after a certain number of client devices have connected to the setup VAP or a combination of both.

The duration of a timer may be set by either the network configuration component 206 or by the router 120. For example, the network configuration component 206 may instruct the router 120 to revert back to the closed state—i.e., to refuse all connections to the setup VAP—after a predetermined time period (e.g., fifteen minutes). The user would have fifteen minutes to use a network configuration component 206 on a second (or more) client device(s) 130 before the timer expires and the setup VAP returns to the closed state. Moreover, the network configuration component 206 may permit the user to set the duration of the timer (as well as explain to the user that leaving the setup VAP open may be a security risk).

Alternatively or additionally, the router 120 may monitor how many connections have been made to the setup VAP while in the open state. For example, the user may instruct the network configuration component 206 that she intends to configure another two devices to connect to the router 120. When the network configuration component 206 commands the router 120 to switch to the open state, it may also instruct the router 120 to switch back after two devices have connected to the router 120 using the setup VAP. Additionally, the router 120 may switch back to the closed state at the earliest, or latest, of (1) a timer expiring or (2) reaching the maximum number of connections permitted to the setup VAP. This permits a second client device 130 to be configured more quickly but also reduces the risk of a security breach.

Although embodiments are described herein with reference to using a timer or maximum number of connections to increase security of the setup VAP, other techniques of minimizing the security risk of an open access point are broadly contemplated. Persons skilled in the art will recognize other methods of controlling access such as a temporary transaction code and the like.

Figure 4:
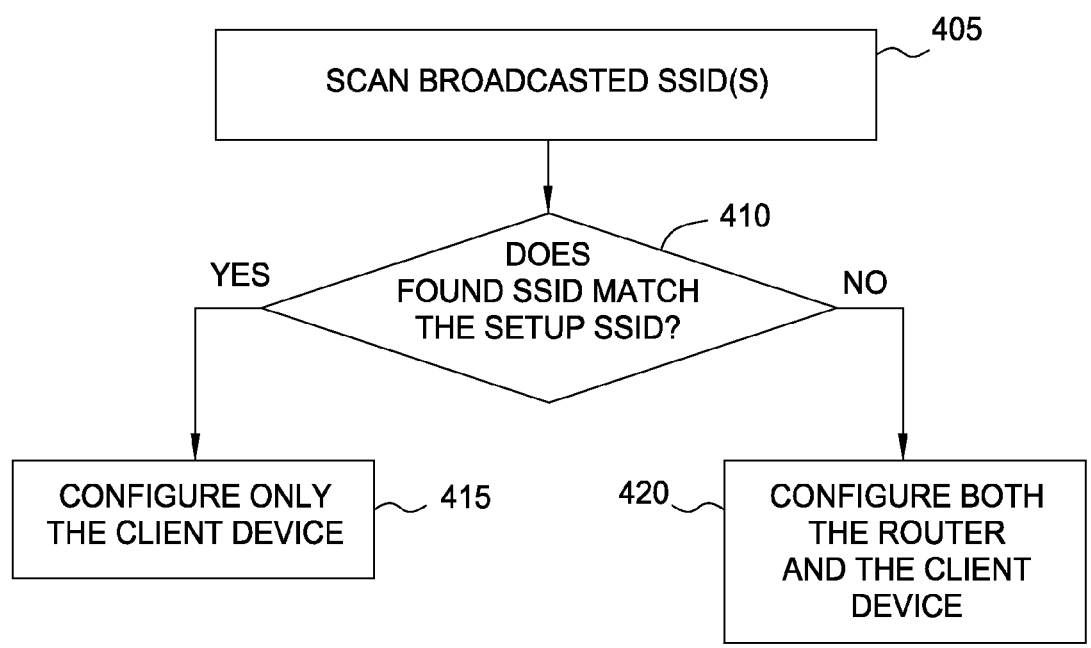
FIG. 4 is a flow illustrating a setup application for configuring a network, according to one embodiment.

FIG. 4 is a flowchart illustrating a method of determining the state of a network device, according to one embodiment. For example, after performing the steps of FIG. 3 on a first client device 130, a different instance of the network configuration component 206 may be run on a second client device 130 to also connect it to the router 120. In one embodiment, the network configuration component 206 may be software encoded on a portable computer-readable storage medium such as a compact disk, flash drive, or other non-volatile storage device. The storage medium may then be communicatively coupled to the second client device 130 which loads the network configuration component 206 into the memory 204. In yet another embodiment, the network configuration component 206, or selected components thereof, could be received or downloaded from a web server in order to provide this system to simplify secure network setup.

At step 405, the network configuration component 206 monitors all available beacons for the predefined SSID that indicates that the setup VAP is in the open state. Furthermore, in another embodiment, the network configuration component 206 may also scan for other predefined SSIDs. For example, the network configuration component 206 may have access to a list of predetermined SSIDs with corresponding instructions to follow if one of the SSIDs is detected. If the network configuration component 206 discovers, for example, the standard SSID associated with the user VAP, it may operate in full configuration mode since the router 120 is unlikely to have a previously configured standard VAP. Similarly, if the network configuration component 206 discovers the setupVAP_CLOSED SSID (or no setup VAP SSID) then it may assume the router 120 is in the closed state. Also, if the network configuration component 206 cannot find any predefined SSIDs, it may provide the user with instructions for powering on the router 120.

At step 410, the network configuration component 206 determines if any of the discovered SSID(s) match setupVAP_OPEN. This predefined SSID is an indicator that the setup VAP of the router 120 is in the open state and will accept incoming connections. If the network configuration component 206 determines that the setup VAP is open, then at step 415 it configures the client device 130 to connect to the router 120. In one embodiment, the network configuration component 206 does not configure or change any settings on the router 120 but only configures the client device 130 to connect to the router 120 and/or installs the client application. Advantageously, the network configuration component 206 automatically determines to skip this process without having to ask the user which portion of the network 102 she is trying to configure.

When configuring the client device 130 to connect to the router 120, the network configuration component 206 typically configures the client device to connect to the router 120 using the standard VAP. That is, after determining that the SSID representing the open state is being broadcasted by the setup VAP, the network configuration component 206 may connect to the setup VAP to retrieve from the router 120 the network name (SSID) and password associated with the user VAP. The network configuration component 206 may then disconnect from the setup VAP and use the retrieved data to connect to the user VAP. In this manner, the network configuration component 206 may connect to an already configured user VAP without any user interaction or input.

In one embodiment, connecting to the setup VAP may require a PIN. The router 120 would compare the PIN to ensure a match with a predefined PIN before transmitting the user VAP information to the client device 130.

Alternatively, the network configuration component 206 may receive the network name and a wireless-network password (if required) from the user. Or the network configuration component 206 may have the necessary information already available and can connect to the router 120 using the standard VAP without input from the user. Having two different VAPs permits the network configuration component 206 to change the SSID of the setup VAP to represent the state of the VAP without changing the SSID of the user VAP, which would affect the wireless connectivity of previously configured client devices 130.

If the network configuration component 206 determines that the setup VAP is closed, then at step 420 it may prompt the user to determine which portion of the network 102 to configure or automatically proceed with configuring both the router 120 and the client device 130.

Figure 5:
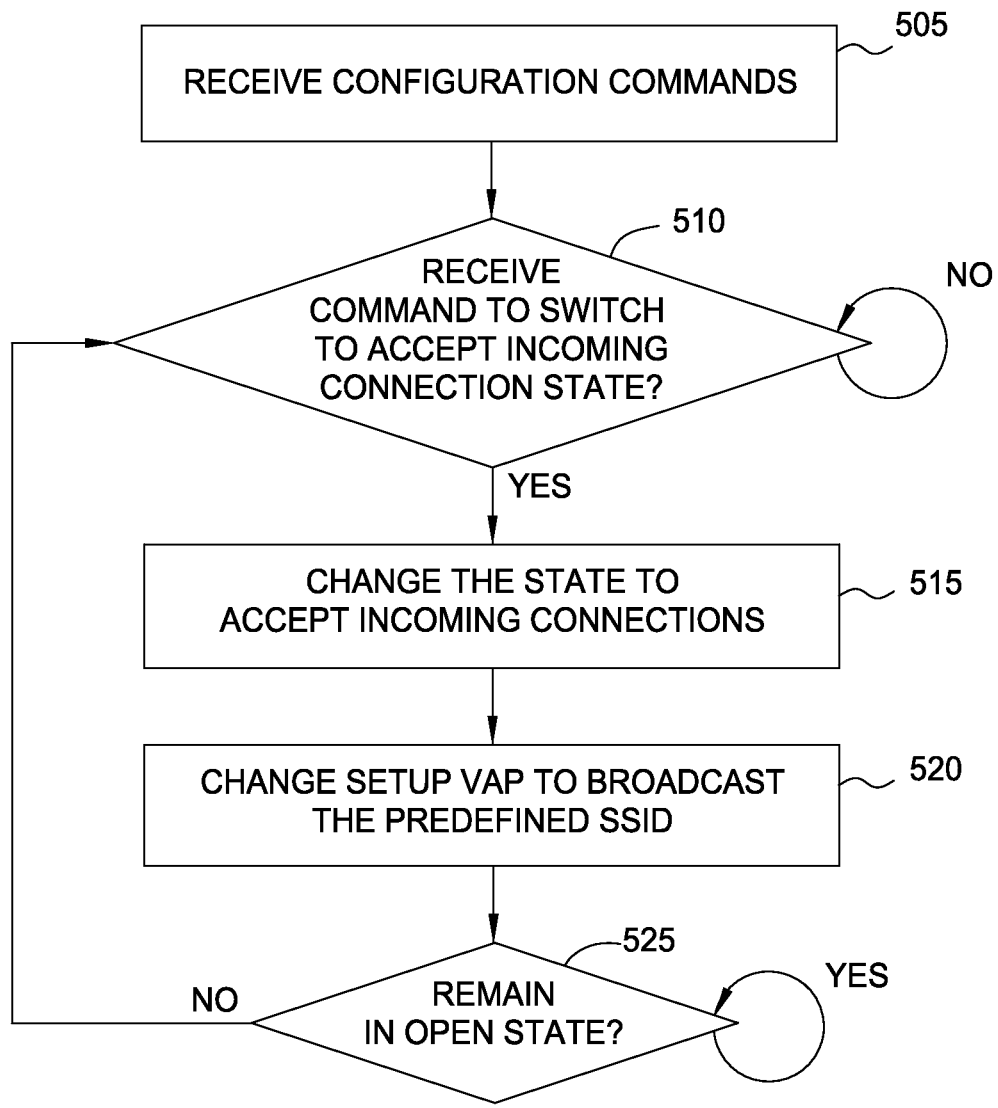
FIG. 5 is a flow illustrating the operations of a router in the network, according to one embodiment.

FIG. 5 is a flowchart illustrating the operation of a network device with a setup VAP. At step 505, the router 120 receives commands that instruct the router 120 to connect to a WAN, setup a DHCP service, establish a user VAP, and the like. In one embodiment, the commands are sent from the network configuration component 206 that is located on one of the client devices 130.

At step 510, the router 120 waits for a command to switch to accept incoming connections on a setup VAP. As discussed previously, the router 120 may have at least two VAPs: a user or standard VAP which includes a network name that is sent by the network configuration component 206 and the setup VAP which allows the router 120 to broadcast its current state. That is, the router 120 uses the setup VAP to save and advertise the current state of the network 102. If the router 120 has already been configured, then whenever a new client device 130 is configured to connect to the network 102, the router 120 does not need to be reconfigured. When the user decides to add a client device 130 to the network 102, the user may instruct the network configuration component 206 to send a command to the router 120 that changes the state of the setup VAP. This changed state informs any potential client devices 130 of the current state of the network 102. Accordingly, when a different instantiation of the network configuration component 206 is executed on a client device 130 attempting to connect to the router 120, the network configuration component 206 will determine not to configure any settings of the router 120.

At step 515, the router 120 changes the state of the setup VAP to accept incoming connections. To indicate that the state has changed, the router 120, at step 520, changes the SSID associated with the setup VAP beacon to advertise to any wireless device that the state has changed. A network configuration component 206 that is currently configuring a client device 130 can detect the changed SSID and determine that the router 120 does not need to be configured. The network configuration component 206 can then configure the client device 130 to connect to the router 120.

Because of security concerns, in one embodiment the router 120 may only temporarily accept incoming connections on the setup VAP. At step 525, the router 120 evaluates whether the state of the setup VAP should remain open. For example, once the router 120 receives a command to change the state of the setup VAP, it may start a timer that, once it expires, indicates that the setup VAP should revert back to a closed state. The duration of the timer may be stored on the router 120 in memory 210 or be received from the network configuration component 206. Alternatively or additionally, the router 120 may establish a maximum number of connections allowed to the setup VAP before the state is changed back to a closed state. The maximum may also be provided by the network configuration component 206 (or the user) or be set to a default value found in memory 210.

In one embodiment, the network configuration component 206 may reset the timer or raise the maximum number of permissible connections to the setup VAP to prevent the state from reverting back to a closed state. For example, the user may use the network configuration component 206 on a first client device 130 to change the state of setup VAP in anticipation of configuring a second client device 130, but after configuring the second client device 130, the user may want to configure a third client device 130. The user may then use the network configuration component 206 or an installed client application on the second client device to extend the duration of the open state or change the setup VAP to the open state if it has already closed.

Similarly, the network configuration component 206 may ask the user whether to change the state of the setup VAP to close after the corresponding client device 130 is successful configured even if the timer has not yet expired or the maximum number of connections has not been exceeded. Thus, if the user adds fewer devices or configures those devices in less time than she original anticipated, the user can prematurely close the setup VAP to further minimize any chance of a security breach.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for configuring a computing device to connect to a network device that broadcasts a first beacon and a second beacon to the computing device, comprising:
   instructing the network device, from a different computing device, to change the first beacon from a third network name to a first network name, wherein the first network name indicates that a first access point accepts all incoming connections from any computing device, wherein the first network name and the third network name are associated with respective ones of a first state and a second state of the first access point associated with the first beacon, wherein the first state indicates that a second access point associated with the second beacon has previously been configured, and wherein the second state does not permit any computing device to wirelessly connect to the network device using the third network name;
   determining using the computing device whether the first access point is in the first state, wherein the first access point is in the first state when the first network name within the first beacon matches a predetermined network name, and the first access point is determined to be in the second state when the first network name does not match the predetermined network name;
   upon determining that the first access point is in the first state, presenting from the computing device a first interface for configuring the computing device to connect to the network device using a second network name associated with the second beacon, wherein the instructing the network device is performed before the configuring the computer device, and wherein the configuring the computing device to connect to the network device is performed from the computing device; and
   upon determining that the first access point is in the second state, presenting a second interface from the computing device to a user, wherein the second interface configures the network device to connect with the computing device.

2. The method of claim 1, wherein the first network name is stored on the network device and is not wirelessly transmitted to the network device.

3. The method of claim 1, further comprising instructing the network device to, after at least one computing device wirelessly connects to the first access point, at least one of: (i) change the first beacon from the first network name to the third network name or (ii) stop broadcasting the first network name.

4. The method of claim 1, wherein the first and the third network names are service set identifiers (SSID), and the first and the second beacons are broadcasted in parallel.

5. The method of claim 1, further comprising, configuring the network device to, after a time period expires, at least one of: (i) change the first beacon from the first network name to the third network name and (ii) stop broadcasting the first network name.

6. The method of claim 5, wherein a duration of the time period is configurable by a user of the computing device.

7. The method of claim 5, wherein a duration of the time period is predetermined and is less than fifteen minutes.

8. A network device, comprising:
   a first access point, wherein a first network name and a second network name are associated with the first access point;
   a second access point, wherein a third network name is associated with the second access point; and
   a radio that broadcasts a first beacon associated with the first access point and a second beacon associated with the second access point,
   wherein the radio is configured to switch from broadcasting the second network name to broadcasting the first network name in the first beacon upon receiving a command from a computing device, and wherein the first network name indicates that the second access point has previously been configured, and
   wherein the second access point is configured to allow the computing device to use the third network name associated with the second beacon to communicate with the network device, and the computing device includes a client application which, upon detecting the first network name, presents to a user of the computing device a first interface.

9. The network device of claim 8, wherein the first network name is predetermined and is stored on the network device and is not received by a wireless communication to the network device.

10. The network device of claim 8, wherein the first and the second network names are service set identifiers (SSID).

11. The network device of claim 8, wherein, after a time period expires, at least one of:
    (i) the first beacon is changed from the first network name to the second network name, and
    (ii) the first network name is not broadcasted by the radio.

12. The network device of claim 8, wherein, after one or more computing devices establishes wireless connection with the network device using the first access point, at least one of:
    (i) the first beacon is changed from the first network name to the second network name, and
    (ii) the first network name is not broadcasted by the radio.

13. A computer program product for configuring a computing device to connect to a network device that broadcasts a first beacon and a second beacon, the computer program product includes computer code stored on a non-transitory computer-readable medium, the computer code comprising:
    computer code instructing the network device, for a different computing device, to change the first beacon from a third network name to a first network name, the first network name indicating that a first access point accepts all incoming connections from any computing device, wherein the first network name and the third network name are associated with respective ones of a first state and a second state of the first access point associated with the first beacon, wherein the first state indicates that a second access point associated with the second beacon has previously been configured, and wherein the second state does not permit any computing device to wirelessly connect to the network device using the third network name;
    computer code that determines at the computing device whether the first access point is in the first state, wherein the first access point is in the first state when the first network name within the first beacon matches a predetermined network name, and the first access point is determined to be in the second state when the first network name does not match the predetermined network name;

computer code that, upon determining the first access point is in the first state, presents from the computing device to a user of the computing device a first interface, the first interface adapted to configure the computing device to connect to the network device using a second network name associated with the second beacon, wherein the instructing the network device is configured to be performed by the computer code before the configuring the computer device; and computer code that, upon determining the first access point is in the second state, presents from the computing device to the user of the computing device a second interface adapted to configure the network device to connect with the computing device.

14. The computer program product of claim 13, wherein the first network name is predetermined and is stored on the network device and the first network name is not determined by wirelessly transmitting a network name to the network device.

15. The computer program product of claim 13, further comprising computer code configuring the network device to, after a time period expires, at least one of: (i) change the first beacon from the first network name to the third network name or (ii) stop broadcasting the first network name.

16. The computer program product of claim 13, further comprising computer code configuring the network device to, after at least one computing device wirelessly connects to the first access point, at least one of: (i) change the first beacon from the first network name to the third network name or (ii) stop broadcasting the first network name.

* * * * *